United States Patent [19]

Wilke

[11] Patent Number: 4,645,675
[45] Date of Patent: Feb. 24, 1987

[54] STARCH-BASED DRY PRODUCT IN THE FORM OF FLAKES, BITS, OR GRAINS IN POROUS BAGS FOR MAKING DUMPLINGS

[76] Inventor: Gerhard Wilke, Hölderlinweg 1, 6900 Heidelberg, Fed. Rep. of Germany

[21] Appl. No.: 664,419

[22] Filed: Oct. 24, 1984

[30] Foreign Application Priority Data

Oct. 27, 1983 [DE] Fed. Rep. of Germany ....... 3338887

[51] Int. Cl.⁴ ............................................. A23L 1/214
[52] U.S. Cl. .................................... 426/113; 426/637; 426/450
[58] Field of Search ............... 426/637, 113, 412, 107, 426/128, 111, 122, 123, 389, 450

[56] References Cited

U.S. PATENT DOCUMENTS

| 2,969,292 | 1/1961 | Heller | 426/113 |
|---|---|---|---|
| 3,081,174 | 3/1963 | Gay | 426/113 |
| 3,220,852 | 11/1965 | Gerkens et al. | 426/637 |
| 3,395,025 | 7/1968 | Hermanson | 426/113 |
| 3,615,712 | 10/1971 | Keller | 426/113 |
| 3,925,563 | 12/1975 | Straughn et al. | 426/637 |
| 3,955,001 | 5/1976 | Kuepach et al. | 426/128 |
| 3,997,684 | 12/1976 | Willard | 426/637 |
| 4,007,286 | 2/1977 | Ooraikul | 426/637 |
| 4,110,478 | 8/1978 | Ooraikul | 426/637 |
| 4,131,689 | 12/1978 | Wilke | 426/445 |
| 4,156,032 | 5/1979 | Kluge et al. | 426/637 |
| 4,241,094 | 12/1980 | O'Neil et al. | 426/637 |
| 4,455,321 | 6/1984 | Glabe et al. | 426/637 |
| 4,514,426 | 4/1985 | Jordan et al. | 426/113 |

FOREIGN PATENT DOCUMENTS

| 248845 | 8/1966 | Austria . | |
|---|---|---|---|
| 1049685 | 1/1959 | Fed. Rep. of Germany . | |
| 1251639 | 10/1967 | Fed. Rep. of Germany . | |
| 2648376 | 4/1978 | Fed. Rep. of Germany | 426/113 |
| 2855328 | 6/1980 | Fed. Rep. of Germany | 426/637 |

OTHER PUBLICATIONS

Child et al., 1974 Mastering the Art of French Cooking, vol. 1, A. Knopf, New York, pp. 521-523.

Primary Examiner—Raymond N. Jones
Assistant Examiner—Carolyn Paden
Attorney, Agent, or Firm—Staas & Halsey

[57] ABSTRACT

A starch-based dried product in the form of flakes, bits, or grains having a thickened skin which is immediately converted to an edible dumpling state by immersion of the dried product in a water permeable bag into hot water. The dry starch-based product is made by forming a moist mixture from a starch-based starting material kneading the mixture; rolling the mixture into a thin film of paste of 1.8 mm to 3 mm; heating the paste film to a temperature and effected such that a skin is formed on only the underside of the paste film while the paste film has a residual moisture of at least 20% and maintaining the heating temperature to cause rapid evaporation of at least a portion of the water present in the paste film; drying the paste film; and comminuting said paste film.

15 Claims, No Drawings

STARCH-BASED DRY PRODUCT IN THE FORM OF FLAKES, BITS, OR GRAINS IN POROUS BAGS FOR MAKING DUMPLINGS

BACKGROUND OF THE INVENTION

The invention concerns an instant, pouch starch-based dried dumpling product in the form of flakes, bits, or grains which are instantly converted to an edible dumpling stage of immersion of the product in a pouch into hot water.

The invention thus creates a dry, starch-based product from which so-called "pouch dumplings", which are presently enjoying great popularity, may be made. These pouch dumplings save a significant portion of the time hitherto required to prepare them, and in particular make it possible even for unskilled members of the household to produce ready-to-eat dumplings of good quality.

Despite the incontestable advantages of such pouch dumplings, up to now their preparation has always required a significant amount of and quality has not always been consistent. The desire and the need thus arises for dumplings which can be made with only the most minimal preparation time, especially for consumption outside the home, without the need for an actual cooking process, i.e., a so-called "instant dumpling" which is ready to eat immediately in a few minutes or so by immersion in hot water.

SUMMARY OF THE INVENTION

Therefore, it is a principal object of the invention to provide an instant, pouch dumpling product which is of consistently good quality, yet can be instantly converted into a ready-to-eat dumpling condition. To achieve this, the dumpling product according to the invention comprises a dry starch-based product in the form of flakes, bits or grains with a thickened skin which are instantly converted into ready-to-eat dumpling condition by introducing the dry starch-based product in a water-permeable pouch into hot water, the dry starch-based product being made by forming a moist mixture from a starch-based starting material; kneading said mixture; rolling said mixture into a film of paste of 1.8 mm to 3 mm; heating said paste film to a temperature and effected such that a skin is formed on only the underside of the paste film while the paste film has a residual moisture of at least twenty (20%) percent and maintaining said heating temperature to cause rapid evaporation of at least a portion of the water present in the paste film; drying said paste film; and comminuting said paste film.

According to a one preferred variant, wherein the paste film is heated when the moisture content is at least 40%.

According to a further preferred variant, the paste film is heated by bringing the initial gelatinized and hydrolyzed paste film into contact with a heated plate, a heated roller, or with hot air.

According to a further preferred variant, the porosity of the paste film is accomplished by the application of a vacuum, by heating under pressure with subsequent relief of the pressure, or by an extrusion process.

According to a further greferred variant, the according to the invention has a dough base.

According to yet another preferred variant, the according to the invention has a potato base.

DETAILED DESCRIPTION OF THE PREFERRED EMBODIMENTS

At home, the gelatinization and hydrolyzation of starch from starchy raw materials is accomplished by boiling or steaming, as for example in preparing boiled potatoes, in which the starch remains within its original cell membrane, expands within the cell liquid, and is hydrolyzed by the heating.

Another common method for gelatinizing or hydrolyzing starch is the baking process, in which a more or less viscous dough is formed and is heated to a temperature which lies above the gelatinization temperature of all the starch particles.

In the case of tubers, such as the potato and other starchy tubers, yet another form of hydrolyzed starch is obtained, namely when the raw tuber is grated to a pulp and this pulp is heated in a skillet. Since a significant quantity of separate starch particles are outside the cell membranes, and since cell enzymes may yet become active, a different kind of product results from the same raw material. Depending on the amount of heating, this product appears as a glutinous, slimy substance.

To obtain a dry product suitable for pouch dumplings, one might think of drying previously-chopped, boiled potatoes on a roller dryer and filling bags with the resulting flakes. Such flakes are made of cooked, dried potatoes have been known and on the market for a long time. If a cooking pouch is filled with such flakes and this pouch is immersed in hot water, however, the following happens: the outer edges of the pouch contents expand very rapidly, producing a dense zone impervious to water, such that the greater portion of the pouch contents remains dry, not moistened.

Even if the greater portion of the pouch contents were to be successfully moistened, should the pouch be immersed very slowly into low-temperature water, the mass which results in the interior of the cooking pouch does not have the consistency and structure of a dumpling. It is neither possible to cut the pouch contents nor to tear it apart with two forks.

The resulting product has the consistency of thick mashed potatoes.

If one were to attempt to obtain flakes of hydrolyzed, raw potatoes from other forms of potatoes, namely from grated raw potatoes subjected to simultaneous heating and drying, it is indeed possible to cause these flakes to expand in a cooking pouch upon immersion in hot water. However, the product thus obtained consists of a viscous, slowly flowing pulp, which is nothing like a dumpling.

If, on the other hand, according to the invention, dried cooked or steamed potatoes in granular form are mixed with raw grated potatoes—that is, if particles whose starch has already been hydrolyzed, such as in the case of the cooked potatoes, are mixed with particles whose starch is still raw and only partially hydrolyzed within the natural cell membranes—and if one places this mixture on a surface or roller heated to a temperature above the gelatinization temperature of the starch, then one obtains a film which exhibits an irregular, slightly fibrous structure.

These film particles can be separated into flakes while being dried, or shaped into a wide variety of granular shapes by employing granulating devices.

Dry products according to the invention can be produced from raw potatoes alone, as well as from the potato particles described above consisting partially of cooked potatoes and partially of raw potatoes.

According to the invention, for example, one may first place the raw, grated potatoes in a centrifuge or press, using this centrifuge or press to extract and remove the juice. This juice from the raw potato mass contains part of the extracted starch in addition to water and substances dissolved in it.

If one kneads the raw, fibrous centrifuged or pressed solids with starch separated from the extracted juice, then mixes this mass with the potato albumin from the extracted juice, and finally then adds 30% of the remaining potato juice, this mixture can be processed further exactly in the manner described above.

One then obtains flake-like particles or granules which, when poured into a bag, yield a so-called "raw potato" instant dumpling.

When manufacturing the dry product according to the invention, in order to impart a skin to the particle surfaces of the film, one may raise the temperature of a roller dryer or drying surface high enough, e.g., 125° C., for the underside of the film on the drying roller or conveyor plate to dry fully, while the greater portion of the film above it retains a moisture content of over 20%.

In this case, after final drying or penetration of the moisture throughout the dried particles, a product results which has a skin on one side.

However, it is also possible to proceed such that the resulting particle film is heated only a little above the gelatinization point of the starch; it is then transferred to a belt which takes it through a heating channel where it is heated briefly to a higher temperature, e.g., 110° C., causing the formation of a dry skin over the entire surface of the particle film. It is subsequently dried gently, e.g., at 65° C., until the desired residual moisture content is reached.

The so-called perforation of the film is then performed in order to provide the film material with the desired porosity. This is done under conditions which cause a rapid, and in particular an abrupt, "puffing" evaporation of the water, thus, for example, by:

(a) heating on a heated belt or roller surface above 110° C.,
(b) heating while creating a vacuum,
(c) heating under pressure with subsequent relief of the pressure, preferably in an autoclave or an extrusion process.

The interaction of the features described above results in the pouch dumpling filling having the characteristic—suitable for instant use—of starch particles which expand, hydrolyze, or gelatinize sufficiently.

This gelatinization of the starch is necessary both for technical and health reasons, since the temperature required for rapid and complete gelatinization of the starch is usually not reached when immersing an instant pouch dumpling in hot water.

Without adequate prior gelatinization of the starch in the dry product, the finished dumpling will not have sufficient structure. It will not achieve a porous solidity, but rather will be in a loose, flowing, sticky state. It is also important from the standpoint of health, however, that the starch particles be sufficiently expanded or gelatinized before consumption.

The essence of the present invention will be explained further through the following examples or embodiments, which represent preferred variants.

EXAMPLE 1

10 kg of coarse granules made from dried, peeled, precooked potatoes are mixed with 8 kg of solids from grated raw potatoes, with the gratings having a width of 1 to 1.5 mm and a length of 5 to 10 mm.

To this above mixture are added:
0.8 kg semolina
0.1 kg dried albumen
0.18 kg table salt
0.04 kg seasonings The entire mixture is mixed for 5 minutes in a kneader and then turned onto a roller having a surface temperature of 125° C., such that several pressure rollers create a 1.8-mm-thick film of material paste to be processed.

Two processes take place in succession on the surface of the roller. First, the portion of the film lying directly on the roller surface is heated to a high temperature. As this happens, a skin forms on the underside of the film. This skin is at first tightly elastic. Since the surface of the roller is at a temperature of 125° C., part of the water in the film evaporates immediately. At the same time, due both to heat conducted from the surface of the heating roller and to the abruptly evaporating water, the mass or film of paste is heated above the gelatinization point of the starch.

The consistency of the film is greatly altered due to the gelatinization of the starch. This change in consistency has the effect that the path taken by the evaporating water remains in the form of pores which penetrate the entire thickness of the film.

When the residual moisture content of the entire film has reached about 25%, the film is removed with a scraper and further dried in a drying channel to a residual moisture content of 5%.

After complete drying, the film skin which formed primarily on the heating roller is denser than the remainder of the film material which is permeated by pores.

At the end of the drying process, the film is broken up by a breaking device into irregularly-shaped pieces with a length of 3 to 6 mm on a side.

EXAMPLE 2

20 kg of raw potatoes are thoroughly cleaned, peeled, and grated in a grater such that the gratings are 1.5 mm wide and 5 to 10 mm long.

These gratings are placed in a centrifuge until the water content of the concentrate reaches 40 to 45%.

The extracted juices, measuring about 10 kg, are again centrifuged, and the potato starch contained therein is separated (0.5 to 1 kg, depending on the kind of potato).

Next, the albumin in the potato juice is precipitated by altering the pH through the addition of 20 g citric acid by raising the temperature to 60° C. This yields about 200 g of moist albumin.

To the 10 kg of centrifuge residue having a moisture content of 40 to 45%, the 0.5 to 1 kg of fresh potato starch and the 0.2 kg of moist potato albumin, there are added: an additional 3 kg dry potato starch, 0.175 kg coagulatable dried albumin, 0.2 kg skim milk powder, 0.12 kg table salt, and 0.1 kg seasonings.

This mass is subsequently processed as described in example 1.

EXAMPLE 3

Part (a)

25 kg wheat flour are mixed with
1 kg freshly-beaten whole eggs
The following are added to the above mixture:
8 liters skim milk
0.3 kg table salt
0.15 kg baking powder
0.2 kg seasonings.

These ingredients are kneaded 10 minutes in a bread mixer and then rolled out on a dough roller into a film 1000 mm wide and 3 mm thick.

This film is drawn onto a heated belt having a surface temperature of 140° C. The thin layer of the material film which comes into direct contact with the hot belt is heated very rapidly. Thus a thin, elastic skin, supported by the coagulatable albumin paste, forms on the underside of the film; immediately thereafter, the water contained in the film "puffs" as it evaporates. The steam heats the remainder of the paste mass and gelatinizes the starch in it.

Since the film is only heated from the bottom, the top surface of the film remains plastic enough for the steam to escape, forming numerous small pores through the paste material. When the film reaches a residual moisture content of 20%, it is transferred to a drying channel and dried at 60° to 70° C. to a residual moisture content of 5%. The film is next separated into pieces, being shredded into individual particles with a granular size of about 4 mm.

Part (b)

10 liters of water are heated to 95° C. in an impeller mixer. Mixing constantly and reheating as necessary, 3 kg durum wheat semolina are added to this water and stirred until the wheat starch has gelatinized.

After cooling to 50° C., 1 kg of liquified solid shortening having a melting point of 32° C. is added while mixing continues.

After cooling to 25° C., the mass produced according to the Part (b) is carefully blended with the mass produced according to Part (a) and transformed into lumps 3 to 15 mm in diameter in a granulating device. The residual moisture content of these lumps is reduced to 5% in a vacuum dryer.

I claim:

1. An instant, pouch dumpling product comprising:
(a) a water-permeable pouch; and
(b) a starch-based product of an irregular, slightly fibrous structure in the form of dry, pre-gelatinized, porous flakes, bits or grains with a thickened outer membrane skin which are instantly converted into ready-to-eat dumpling condition by introducing the dry starch-based product in the water-permeable pouch into hot water for only 1-2 minutes, the dry starch-based product being made by (i) forming a moist mixture from a starch-based starting material, the moist mixture having a moisture content of at least 20%; (ii) kneading said moist mixture; (iii) rolling said moist mixture into a film of paste of 1.8 mm to 3 mm; (iv) heating said paste film to a temperature and effected such that said thickened outer membrane skin is formed on the underside of the paste film while the paste film has a residual moisture of at least 20% and to maintaining said heating temperature to the paste film to cause rapid evaporation of at least a portion of the water present in the paste film while the paste film has a residual moisture of at least 20% such that the paste film is gelatinized and formed with pores; (v) drying said paste film and (vi) comminuting said paste film into said flakes, bits or grains of the starch-based product.

2. A process for the production of a dry starch-based product in the form of flakes, bits or grains which are instantly converted into ready-to-eat dumpling condition by introducing the dry starch-based product in a water-permeable pouch into hot water, said process comprising the steps of:
(a) forming a moist mixture from a starch-based starting material, the mixture having a moisture content of at least 20%;
(b) kneading the starch-based moist mixture;
(c) rolling the moist mixture into a film of paste of 1.8 mm to 3 mm;
(d) heating the paste film to a temperature and effected such that a skin is formed on the underside of the paste film while the paste film has a residual moisture of at least 20%;
(e) after step (d), maintaining the heating temperature to the paste film to cause rapid evaporation of at least a portion of the water present in the paste film while the paste film has a residual moisture of at least 20%;
(f) drying the paste film; and
(g) comminuting the paste film.

3. The method of claim 2, wherein at the beginning of the heating step (d) the paste film has a moisture content of at least 40%.

4. The method of claim 3, wherein in steps (d) and (e) the paste material is heated on a roller surface and the rapid evaporation of at least a portion of the water present in the paste film is carried out at a temperature of the roller surface of approximately 125° C.

5. The method of claim 3, wherein in steps (d) and (e) the paste film is heated on a belt surface and the rapid evaporation of at least a portion of the water present in the paste film is carried out at a temperature of the belt surface of approximately 140° C.

6. The method of claim 3, wherein in step (f) the paste film is dried at a temperature of 60°-70° C. to a residual moisture content of approximately 5%.

7. The method of claim 3, wherein step (f) of drying the paste material is provided after the residual moisture content of the paste film during step (e) has reached approximately 25%.

8. The method of claim 2, wherein the paste film is a dough-based material.

9. The method of claim 2, wherein the paste film is a potato-based material.

10. The method of claim 2, wherein in steps (d) and (e) the paste material is heated on a roller surface and the rapid evaporation of at least a portion of the water present in the paste film is carried out at a temperature of the roller surface of approximately 125° C.

11. The method of claim 10, wherein in step (f) the paste film is dried at a temperature of 60°-70° C. to a residual moisture content of approximately 5%.

12. The method of claim 2, wherein in steps (d) and (e) the paste film is heated on a belt surface and the rapid evaporation of at least a portion of the water present in the paste film is carried out at a temperature of the belt surface of approximately 140° C.

13. The method of claim 12, wherein in step (f) the paste film is dried at a temperature of 60°-70° C. to a residual moisture content of approximately 5%.

14. The method of claim 2, wherein in step (f) the paste film is dried at a temperature of 60°-70° C. to a residual moisture content of approximately 5%.

15. The method of claim 2, wherein the moist mixture from a starch-based starting material consists partially of cooked potatoes and partially of raw potatoes.

* * * * *